May 8, 1956
H. R. STEPHENSON ET AL
2,744,548
SAW CHAIN AND TOOTH THEREFOR
Filed Aug. 15, 1952
2 Sheets-Sheet 1
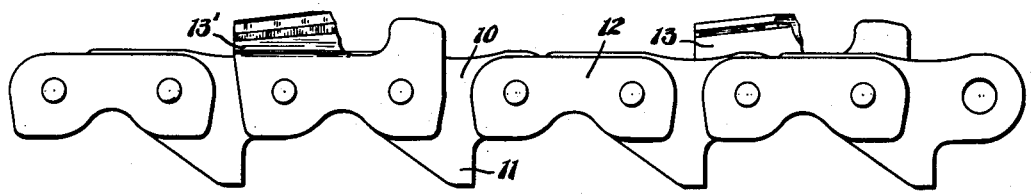
Fig. 1.
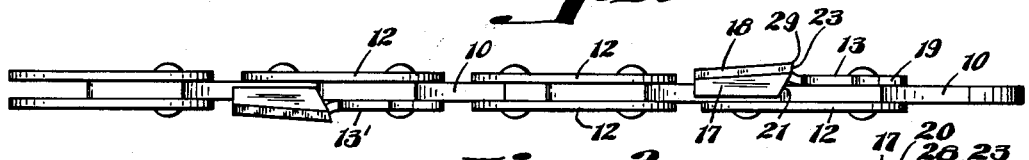
Fig. 2.
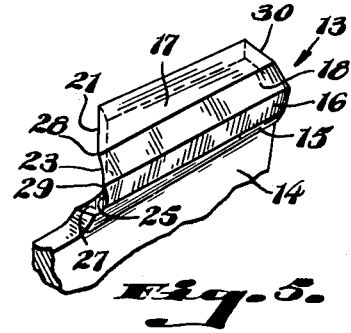
Fig. 5.
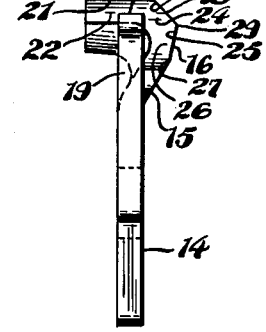
Fig. 3.
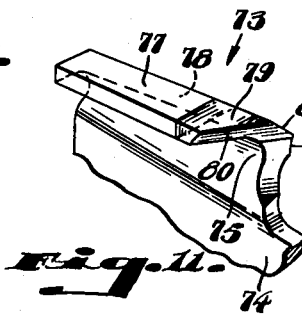
Fig. 11.
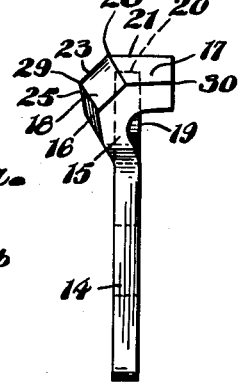
Fig. 3a.
Fig. 4.
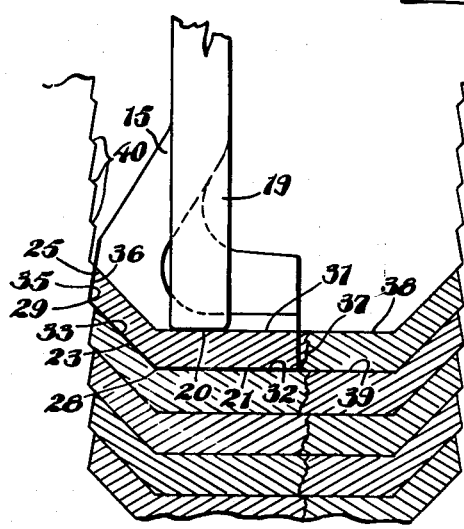
Fig. 6.
INVENTOR.
HENRY R. STEPHENSON
and DEWEY E. GOMMEL,
BY:
Harold B. Hood.
ATTORNEY.

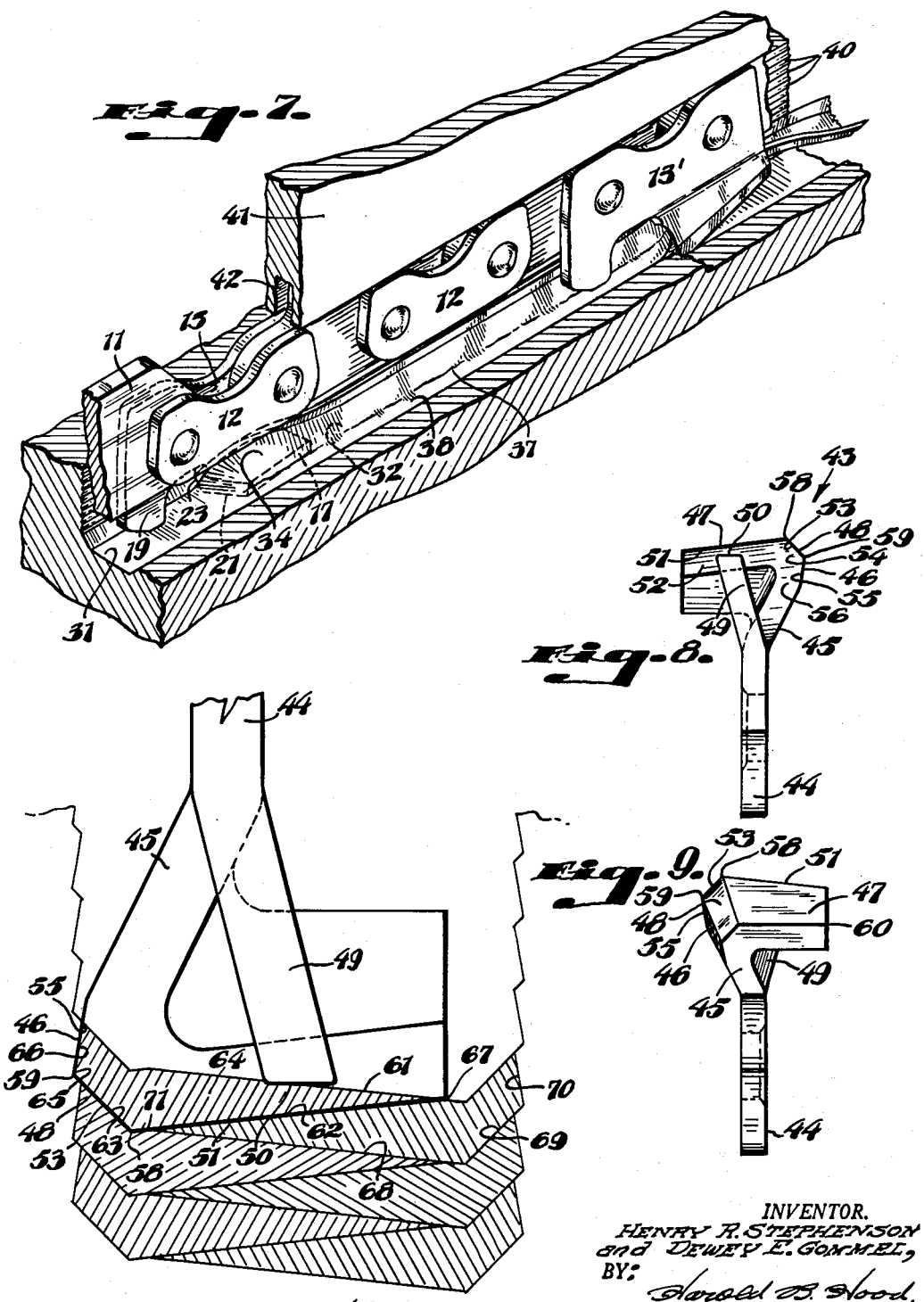

United States Patent Office 2,744,548
Patented May 8, 1956

2,744,548

SAW CHAIN AND TOOTH THEREFOR

Henry R. Stephenson and Dewey E. Gommel, Indianapolis, Ind., assignors, by mesne assignments, to Borg-Warner Corporation, Chicago, Ill., a corporation of Illinois Application August 15, 1952, Serial No. 304,618

12 Claims. (Cl. 143—135)

The present invention is concerned with saw chains and with a novel form of tooth for use therein. The primary object of the invention is to provide an improved saw chain in which we use a tooth form which, while differing only slightly in appearance from teeth known prior to our invention, results in astonishingly improved performance of the chain as compared with any form of chain heretofore known to us. A further object of the invention is to provide a novel tooth, for use in saw chains, said tooth being possessed, to a remarkable degree, of all of the operational advantages of previously-known router-type teeth for use in chain saws and being, at the same time, remarkably free from the operational defects or deficiencies of previously-known router-type teeth.

While chain saws, and the saw chains which constitute the cutting elements thereof, are relatively ancient in the patent art, they have come into substantial use in the commercial cutting of timber in this country only within the past decade. As these tools were developed, primarily in Germany and in Canada in the late 1930's, the chains were universally of the so-called "scratcher" type, their teeth being modeled generally after the teeth of a conventional cross-cut saw and being of such character as to gnaw or scratch the wood away in the form of relatively fine sawdust.

The first important departure from conventional saw chain forms utilized a tooth, now commonly known as a "square chisel" tooth, having a sharpened shank located and designed to run in, and define, a side wall of the kerf, and a sharpened toe carried at the distal end of the shank and located and designed to run in, and define, the bottom of the kerf, said toe projecting from the shank end inwardly toward and beyond the median plane of the kerf and acting to slice under the bottom of the kerf to loosen a chip from the kerf bottom and to pass beneath that chip, leaving the chip lying in the bottom of the kerf to be scavenged therefrom by a following, blunt clearing element or depth gauge. A specific tooth grouping in the saw chain was also new, in which a right-hand router tooth, of the sort just described, and a left-hand router tooth were mounted on a common link and were preceded by a right-hand side-scoring or slitting tooth and a left-hand side-scoring or slitting tooth mounted on a common link.

A later saw chain improvement was the provision of a tooth, known as a "round-back" or "curved back" tooth, and had a straight shank whose sharpened edge met the sharpened edge of the toe in an abrupt angle of approximately 90°, the tooth was formed to provide a reversely-curved shank, sharpened throughout most of its length, with its toe tangentially merging with the distal curve of the shank, such teeth being in a chain devoid of side-scoring or slitting teeth, and in which each tooth was mounted on an individual chain link.

Both types of tooth attained wide acceptance in the timber industry; and it was soon found that each type had certain advantages and certain disadvantages as compared to the other.

Thus, the square-chisel tooth, particularly when arranged in a chain with each tooth mounted on an individual link, tends to guide itself straight through the cut, leaving relatively smooth, even surfaces on opposite sides of the kerf; and we believe this advantageous effect to result from the presence of the relatively long, relatively deep, flat surface provided at the outer face of the tooth shank near its distal end, which surface bears (or at least abuts periodically) against the adjacent kerf wall to guide the tooth. The design of this tooth is such that the depth of the mentioned flat surface is greater than the depth of cut taken by the tooth. When truly sharp, this type of tooth cuts very rapidly; and its cutting life is relatively long.

This square-chisel tooth, however, possesses a sharp, and therefore structurally-weak, point, at the juncture between the toe edge and the shank edge, which point not only tends to break away in hard or knotty work but also dulls rapidly in any kind of work. Further, this sharp point, leading, as it does, the remainders of the toe and shank edges, is the first part of the tooth to strike any obstruction and, under such conditions, tends to guide or throw the tooth out of the true line of intended chain travel, thus causing gouging and, at times, actual wandering of the chain. Sometimes, indeed, when a tooth point strikes a hard knot or other obstruction, the tooth will be actualy up-ended, thus tending still further to break or wear away the point. Further, this point tends to reach beyond its intended travel path, at times, to engage and tear loose the fibers of stringy woods which, being thus suspended in the kerf, are not severed by the remaining parts of the tooth edges. These suspended fibers accumulate in a kerf to an extent such as to bind, and seriously hamper the work of, the saw.

The square-chisel tooth is usually sharpened with a flat file to provide flat bevels on the inner surfaces of the shank and toe, meeting in a dihedral angle. This requires, of course, separate filing operations on the two bevels, and considerable care must be taken to maintain the optimum angularity between the two bevelled surfaces and to avoid nicking the cutting edges near the leading point of the tooth. Attempts have been made to produce and use a file of such cross-sectional shape as to define that angular relationship automatically by attacking both surfaces simultaneously; but such attempts have not been particularly successful.

It will be noted that a round file may be used to sharpen the round-back tooth; and such a file can be used successfully to sharpen the square-chisel type tooth; but great care and a very substantial degree of skill must be exercised in order to avoid dubbing off the point of such a tooth or producing excessive or non-uniform hooking of the shank edge with a round file. Thus, the square-chisel tooth is relatively hard to sharpen.

The round-back tooth, similarly arranged in a chain, will cut successfully through stringy wood without tearing loose fibers and leaving them suspended in the kerf to clog the saw action as above described. It has no such sharp point as that inevitably present in the square-chisel type of tooth, and therefore is not subject to the operational disadvantages resulting from the point, as described above. It is admirably adapted to be sharpened by a cylindrical (round) file or pencil-shaped grinding wheel, attacking the leading faces of the toe and of the shank simultaneously to effect a hollow-ground condition of the toe edge and, depending on the manipulation of the file or wheel, variable degrees of positive or negative hook in the shank edge. When properly sharpened, the chain equipped with the round-back tooth requires less power to drive it through the work than does the chain equipped with square-chisel teeth.

But round-back teeth tend to cause a chain to wander or side-gouge from the true line of the intended cut, thus widening the kerf with a resultant wood waste, and leaving rough, uneven surfaces at opposite sides of the kerf. The cutting edge of the tooth, and particularly that part of it which is formed on the curved shank, is, in our opinion, inefficient and short-lived, with the result that chain embodying round-backed teeth must be sharpened more frequently than chain embodying square-chisel teeth, if cutting efficiency is to be maintained. This more frequent sharpening, of course, shortens the over-all life of the tooth, and so of the chain in which it is embodied.

The broad object of our invention, then, may be said to be to produce a tooth form of such character as to retain, or even to improve upon, the advantageous characteristics of square-chisel teeth and of round-back teeth, while eliminating, largely if not wholly, the several undesirable characteristics of both forms of teeth; and to this end we have evolved the tooth forms illustrated in the accompanying drawings and to be described and claimed hereinafter. It may be said at this point that tests conducted upon chain embodying the tooth structures disclosed herein have demonstrated the successful accomplishment of these objects to an extent, both qualitatively and quantitatively, astonishing to those skilled in the art to which the invention pertains.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a side elevation of a chain fragment constructed in accordance with our invention, and showing one complete cycle of the chain;

Fig. 2 is a plan view of the same fragment, looking from above Fig. 1;

Fig. 3 is a front elevation of a tooth or link constructed in accordance with our invention, drawn to an enlarged scale;

Fig. 3a is a front elevation of a tooth, drawn to an enlarged scale and illustrating a slightly different form of tooth structure than is shown in Fig. 3;

Fig. 4 is a rear elevation thereof;

Fig. 5 is a broken perspective view of the cutting portions and a part of the body of the same tooth or link;

Fig. 6 is a further-enlarged, somewhat idealistic illustration of the mode of operation of our saw chain and tooth in the form illustrated in Figs. 1–5;

Fig. 7 is a perspective view of the chain of Fig. 1 at work;

Fig. 8 is a front elevation of a modified form of tooth or link constructed in accordance with our invention;

Fig. 9 is a rear elevation thereof;

Fig. 10 is a view similar to Fig. 6, but showing the mode of operation of the tooth form illustrated in Figs. 8 and 9; and Fig. 11 is a perspective view, similar to Fig. 5 but showing a tipped tooth embodying our invention.

Referring more particularly to Figs. 1–7 of the drawings, it will be seen that we have illustrated a fragment of a chain consisting of a plurality of links pivotally interconnected in an endless series and including drive links 10, provided with fins or tangs 11 adapted to run in a channel 42 (Fig. 7) of a guide bar 41 and to be drivingly engaged by the teeth of a driving sprocket (not shown) in accordance with conventional practice. The chain includes, also side-connector links 12 which, in some instances, may be arranged in pairs on opposite sides of adjacent drive links 10 to connect said links 10 together. At suitable intervals, cutter-carrying links 13 and 13' will be introduced into the chain; and it will be seen that said links 13 and 13' are identical, except that they are of opposite hand. We presently believe that an optimum arrangement of cutter links in the chain is, as shown, a simple alternating series, though two or more links 13 may be arranged in succession, followed by an equal number of links 13' to complete a cycle, without departing from the scope of our invention.

Since cutter-carrying links 13 and 13' are allochiral, only the link 13 has been illustrated, and will be described, in detail. Each such link comprises a plate having a substantially planar body portion 14 and a shank portion 15 offset from the plane of the body and inclined relative thereto, diverging from said plane as said shank portion retreats from that edge of the body portion from which it extends. Near its distal end, the shank portion 15 is formed to provide, on its surface remote from said body plane, a flat surface 16 disposed in a plane substantially parallel with said body plane. Preferably, the plane of the surface 16 is slightly inclined, for instance at an angle of 10° of divergence from the body plane as it retreats from the body edge; and it is also slightly inclined, for instance at an angle of convergence of 1° 30' as said surface progresses rearwardly. These inclinations are, of course, desirable for the provision of clearance so that the surface 16 will not frictionally rub against the kerf wall in operation.

The cutter further comprises a flat toe portion having an outer flat surface 17 disposed in a plane substantially perpendicular to the body plane and traversing that plane and the median plane of the chain. The outer surface of the cutter is further formed to provide one or more intermediate flat surfaces located between, and joining, the surfaces 16 and 17, adjacent ones of all of said flat surfaces meeting each other in dihedral angles each exceeding 90°. In the illustrated form of our invention, shown in Fig. 3, which we now believe to be optimum, only one such intermediate surface 18 is provided, said surface being located in a plane inclined at an angle of 45° to the body plane and converging therewith as it retreats from the above-identified body edge. In the form of our invention shown in Fig. 3a, two intermediate flat surfaces 18a and 18b are provided, and otherwise the cutter of Fig. 3a is substantially like the cutter of Fig. 3.

The toe surface 17, in this form of the invention, is not precisely perpendicular to the body plane, inclining slightly away from the body edge as it retreats from the shank, for a reason which will appear, and inclining toward the body edge, at a convergence angle of, for instance, 7° as it progresses rearwardly of the link to provide proper clearance. The former inclination of the toe surface 17 is such that, when the sharpened edge 21 of the toe is "raked" or "sheared" rearwardly at a suitable selected angle, the said edge will be directly perpendicular to the body plane (Figs. 3 and 4). We presently prefer a shear or rake angle of approximately 30°, as shown.

As an important feature of our new link, it will be noted that the thickness of metal, measured perpendicular to the surface 18, exceeds the thickness of metal in the shank 15, thus lending added strength to the tooth at this critical point.

Near or at the forward end of the link, a depth gauge 19 is provided; in the ilustrated form of the invention, said depth gauge being coplanar with the body and having its end 20 so disposed as to limit the depth of cut of the edge 21 to preferably one-half the height of the surface 18 in a direction parallel with the body plane.

The tooth herein disclosed is admirably adapted to be sharpened by a round file or small, pencil-shaped grinding wheel or a round-edged grinding wheel. When a tooth is to be so sharpened, the file or wheel is held with its axis parallel with the edge 21 to holow-grind the leading surface 22 of the tooth toe, and preferably in a position to produce a slight hook in the edge 23 of the surface 18, as is perhaps best seen in Fig. 5, and to produce a substantial hook in the edge 25 of the surface 16. The degree of hook thus formed in the edges 23 and 25 is a matter within the discretion of the saw filer, and one on which hardly any two filers will agree. The degree of hook, of course, affects the self-feeding capacity of the tooth; and it will also affect the angularity of the effective bevels of the surfaces 24 and 26 relative to the surfaces 18 and 16, respectively. The degree of hook shown in the drawings produces a somewhat hollow-ground effect for the edge 23 and a relatively sharp, cutting bevel for the edge 25; and it locates the corner or juncture 29 ahead of all other parts of the cutting edges, whereby the edge 23 is given a shear or rake rearwardly toward the corner 28, which tends to counteract the effect of the shear of the edge 21 and provides for smooth cutting, rather than a tearing action, by the edge 23. At the same time, a portion of the shank 15 proper will be sharpened to a cutting edge as at 27.

As a result of this construction, the above-mentioned sharp, projecting point at the juncture between the toe edge and the shank edge of a square-chisel tooth is eliminated, and is replaced by an edge 23, lying flat in the plane of the surface 18 and meeting the edges 21 and 25 in abrupt angles at 28 and 29, respectively. These points of juncture, however, do not project substantially ahead of the adjacent edge portions, and therefore are solidly backed and supported against undue wear and breakage.

The lateral and upward inclination of the toe above mentioned is perhaps best seen on consideration of the line indicated by the reference numeral 30 in Fig. 4.

The manner in which successive teeth in the chain act in the kerf is illustrated, with some idealization, in Figs. 6 and 7. The free end 20 of the depth gauge of any selected tooth 13 rides, as illustrated, on the surface cut by the edge 21 of the preceding tooth of corresponding hand in the chain. The edge 21 of the selected tooth will thus slice under the surface 31 to define a new kerf-bottom surface 32, and the chip 34 will be lifted or turned up slightly as at 37 while the tooth toe slides beneath it, leaving the chip lying loosely in the kerf to be scavenged primarily by the depth gauge 19 of the following tooth of the same hand. At the same time, of course, the edge 23 defines a new surface 33, loosening the outer edge of the chip 34 and tending to turn or roll the chip in the manner shown in Fig. 7. The junction 29 between the edges 23 and 25, of course, defines the outermost boundary 35 of the kerf, and a short section of the edge 25 completes the severance of the outer edge of the chip, producing the surface 36. The inner edge of the chip tends to break away from the work as at 37.

The next tooth, of opposite hand, has its depth gauge supported on the surface 38 so that its toe-edge defines a surface 39 substantially coplanar with the surface 32.

As shown, and because of the relief angle of the surface 16, steps or serrations 40 are formed, by the chain, in the side kerf walls; but it will be seen that the angle of inclination of each surface 36 out of the vertical will be only about 10°; and, since the depth of each surface 36 will be only about 1/16 of an inch maximum, it will be clear that the laterally-inward projection of the steps 40 will be infinitesimal.

Furthermore, analogous illustrations of the prior patent art, which show vertical, planar kerf side walls are entirely unrealistic, as critical analysis of the tooth shapes and inevitable tooth actions will conclusively demonstrate. The square-chisel type of tooth produces a wall shape very similar to that shown, except that the steps are somewhat more pronounced because the shank edge of such a tooth cuts completely to the level of the surface 32; while the curved-back tooth produces double-concave ridges of a lateral height dependent upon the indices of curvature of the tooth back. Tests of chains made up of teeth constructed in accordance with the present invention against chains made up of square-chisel teeth and chains made up of curved-back teeth, under otherwise identical conditions, have conclusively established that chains embodying teeth of the present disclosure produce kerf-wall surfaces which are much smoother, cleaner and straighter than those produced by chains embodying either of the other forms of teeth.

The teeth of the present invention possess all of the advantages of both square-chisel and curved-back teeth, avoid all of the disadvantages of both of the prior art teeth entirely or to a very substantial degree, and develop some desirable functional characteristics not present in either of the previously-known tooth forms. Thus, the provision of the intermediate surface 18, which may be referre dto as a chamfer, with its resultant intermediate edge 23, eliminates the weak and vulnerable outreaching point which is the primary feature of disadvantage of the square-chisel tooth. On the other hand, the present tooth retains the flat guiding surfaces 16 and 17 which are so effective in overcoming any tendency of a tooth to jerk, dart or wander from the theoretical line of tooth travel. The curved-back tooth, lacking any surface equivalent to the surface 16, is notorious for its inability to adhere to that theoretical travel path, with the result that its kerf is unduly wide. Such a wide kerf, of course, means waste of wood and excessive consumption of power.

Power consumption, moreover, is a function of the length of the edge of a cutting tool. Obviously, the straight edge 18 is shorter than would be the curved section of edge of a curved-back tooth, extending between the points 28 and 29.

The present tooth can be sharpened with a round file or pencil-shaped wheel at least as easily as can the curved-back tooth, and much more easily than can the square-chisel tooth. No more skill is required than when sharpening a curved-back tooth. In fact, except as a filer may choose to vary the hook of the edge 25, even an utterly unskilled operator can produce a very satisfactory sharpening of our tooth, because the cylindrical sharpening tool, when held with its axis parallel with the edge 21, will automatically and inevitably produce a satisfactorily sharpened condition of all three edge portions 21, 23 and 25.

The rate or speed at which the new tooth cuts its way through its work is so astonishing as to be difficult to explain. Tests have shown that chains constructed in accordance with the present invention will complete a cut through any kind of wood faster than will a chain of square-chisel teeth or a chain of curved-back teeth.

While we cannot offer, at the present time, a provable explanation for this improvement in speed, we recognize the following factors to which we presently believe this improvement may be largely attributed: The elimination of the out-reaching point of the square-chisel tooth, with its tendency to cause the tooth to dart, both laterally and in the plane of chain travel, out of its intended travel path; the combined guiding effect of the long, flat surfaces 16, 17 and 18 eliminate the gouging and wandering which have been found to be inevitable in the use of chain made up of round-back teeth; and the elimination of the curved cutting edges of the curved-back tooth, in favor of a cutting edge made up exclusively of edge-portions which lie in a plurality of adjacent, angularly-related planes and which join each other in abrupt angles, thus minimizing the power required to force the tooth through its work.

Whatever may be the reason or reasons, it is found in actual practice that the chain of the present invention produces, when used in a chain saw, a tool which cuts faster, generates a narrower kerf with smoother, cleaner walls, and "snuggles down" to its work better than will any previously known chain. Woodsmen frequently say that a chain saw equipped with our chain "feels sweeter" and handles more smoothly and easily than does the same machine, in the same work, when equipped with previously-known chains.

The present tooth is found to be particularly advantageous in cutting the stringy woods in which the square chisel tooth finds so much difficulty. Probably because the straight edge portions of the present tooth leave no room for the escape of stringy fiber ends, it is found that chains embodying the present teeth leave clean kerf walls in even the stringiest of woods. In hard woods, chain embodying the present tooth cuts faster, works longer between sharpenings and has a longer over-all life than chains heretofore known to us.

A modified form of our invention is ilustrated in Figs. 8–10.

The cutter-carrying link, indicated generally by the reference numeral 43, is, in many respects, very closely similar to the link 13, comprising a substantially planar body portion 44 and a shank portion 45 offset and inclined from the plane of the body portion as is the shank 15. Near its distal end, the shank portion 45 is formed to provide a flat surface 46 like the surface 16; and a toe portion having an outer flat surface 47 is carried at the extreme end of the shank. The outer surface of the cutter is further formed to provide one or more intermediate flat surfaces located between, and joining, the surfaces 46 and 47, adjacent ones of all of said flat surfaces meeting each other in dihedral angles each exceeding 90°. As illustrated, only one such intermediate surface 48 is provided, said surface being located in a plane inclined at an angle of approximately 45° to the body plane.

In this form of the invention, the surface 47 is transversely perpendicular to the body plane, as is most clearly apparent by reference to the line indicated by the reference numeral 60 in Fig. 9; but it inclines rearwardly toward the body at a convergence angle of, for instance, 7° for clearance, just as does the surface 17. Because the surface 47 is truly perpendicular in its intersection with the body plane, the raked or sheared edge 51 inclines toward the adjacent edge of the body portion as it retreats from the shank, in the manner most clearly illustrated in Fig. 8.

A depth gauge 49 is formed near or at the forward end of the link 43; and in this form of the invention, the depth gauge is inclined or offset out of the body plane in a direction opposite the direction of inclination of the shank 45. The extremity 50 of the depth gauge is so disposed as to limit the depth of cut of the proximal end of the cutter toe to approximately one-half the height of the surface 48 in a direction parallel with the body plane.

Like the tooth illustrated in Figs. 3–6, this tooth may be readily sharpened with a round file or pencil-shaped wheel, and when so sharpened, the surface 52 will be part-cylindrical so that the edge 51 will be truly hollow-ground, the edge 53 will be somewhat hollow-ground by reason of the shape imparted to the surface 54, and the surface 56 will be bevelled at such an angle as to produce a sharp cutting edge at 55. The edge 53 thus lies flat in the plane of the surface 48 and meets the edges 51 and 55 in abrupt angles at 58 and 59, respectively.

It will be seen, thus, that the tooth of Figs. 8–10 is in all respects substantially identical with the tooth of Figs. 3–6, except that the edge portion 51 is inclined, as shown, and is somewhat longer than the edge portion 21. In use, the tooth of Figs. 8–10 retains all of the advantages of the tooth of Figs. 3–6, as hereinbefore described; but additionally, each tooth completely severs a chip from the kerf, instead of merely turning up the outer edge thereof and relying upon the scavenger or the following tooth of the opposite hand to break or cut it loose. Also, because of the offsetting of the depth gauge 49, each tooth is guided by a surface formed by the preceding tooth of opposite hand, rather than that formed by the preceding tooth of the same hand.

As shown in Fig. 10, the free end 50 of the depth gauge 49 of a selected link rides on a surface 61 defined by the preceding tooth of opposite hand, while the edge 51 of the selected tooth slices under a chip 64 to define a new kerf-bottom surface 62 while the edge 48 defines a surface 63 and the edge 46 defines a surface 66 to free the chip from the kerf wall. Because of the above-explained inclination of the edge 51, the surfaces 61 and 62 are oppositely inclined with respect to the median plane of the kerf; and the inclination of the edge 51, the length of that edge and the location of the end 50 of the depth gauge are so proportioned that the distal end of the edge 51 breaks through the surface 61, as at 67, to sever the chip 64 completely from the kerf bottom. Of course, as with the tooth of Figs. 3–6, the cutter slides on past the chip, leaving the chip lying in the kerf to be scavenged by the depth gauge of the following cutter link.

The cutter of that following link will ordinarily be of opposite hand, and its offset depth gauge will ride on the surface 62 to guide its cutter to define the new surface 68, breaking through the surface 62 at 71, and to define the surfaces 69 and 70 to free the new chip from the kerf wall.

Except for the complete chip severance, resulting from the inclination of the edge 51, the operation of the tooth form of Figs. 8–10 is entirely comparable to that of the tooth form of Figs. 3–6.

The tooth of the present application lends itself readily to tipping with very hard, long-lived material such as, for instance, tungsten-carbide; and in Fig. 11 we have shown a tooth so tipped. The figure shows a fragment of a link 73, similar in all other respects to the link 13, and comprising a body 74, an offset shank 75 and a toe 77, the tooth being provided with a chamfered surface 78 analogous to the surface 18 of the link 13. The forward end of the toe and the chamfered portion is provided, however, in this form of invention, by a separate tip 79 of suitable alloy welded in place and formed to provide the toe edge 80 and the intermediate edge 81. Such an arrangement is made feasible by the fact that the tooth form disclosed herein may be readily sharpened with a pencil-shaped grinding wheel and by the fact that the edge 81 joins the edge 82 in an abrupt angle. Obviously, tungsten-carbide or similar hard material could not be effectively sharpened with a hand file; but, since the present tooth design is such that the adjacent surfaces of the sharpened portions may readily lie in the surface of a common cylinder, the use of a power driven wheel to sharpen the hard material is feasible.

We claim as our invention:

1. A saw chain link carrying a cutter formed to provide a flat, sharpened shank portion and a flat, sharpened toe portion disposed respectively in planes substantially perpendicular to each other, and an intermediate flat, sharpened portion joining said toe portion and said shank portion in abrupt angles.

2. The saw chain cutter of claim 1 in which each such intermediate portion lies in a single plane meeting the plane of said shank portion in an included angle of approximately 125° and meeting the plane of asid toe portion in an included angle of approximately 135°.

3. The saw chain cutter of claim 1 in which each such intermediate portion lies in a single plane meeting the plane of said toe portion in an included angle of approximately 135° and angularly intersecting the plane of said shank portion.

4. A saw chain link carrying a generally L-shaped cutter formed to provide a cutting edge consisting entirely of at least three substantially straight-line portions, adjacent portions of said edge meeting each other in abrupt included angles substantially exceeding 90°.

5. A saw chain link carrying a cutter and comprising a substantially planar plate, a laterally-outwardly-inclined shank, and a toe at the distal end of said shank extending laterally inwardly and traversing the plane of said plate, said toe being formed to provide, on its surface most remote from said plate, a forwardly-facing, straight edge substantially perpendicular to the plane of said plate and extending from the free end of said toe, across said plane, and into a plane parallel with said plate and spaced laterally outwardly beyond said plate, said shank being formed to provide, on its laterally-outermost surface, a forwardly-facing, straight edge substantially parallel with the plane of said plate and spaced laterally outwardly beyond said first-named parallel plane, and said link further being formed to provide a further forwardly-facing straight edge joining said toe edge and said shank edge and meeting the same in included angles of approximately 135°.

6. A saw chain cutter-carrying link comprising a plate having a main body portion disposed substantially in a plane, a laterally-outwardly-inclined shank portion, and a toe portion at the distal end of said shank portion and disposed in a plane generally transverse with respect to the plane of said body portion, said toe being formed to provide, on its surface most remote from said body portion, a forwardly-facing, sharpened, straight edge lying in said generally transverse plane and traversing the plane of said body portion, said shank being formed to provide, on its surface laterally most remote from said body portion plane, a forwardly-facing, sharpened, straight edge, and said cutter further being formed to provide a forwardly-facing, sharpened, straight edge lying in a plane inclined at approximately 45° to the plane of said body portion and joining the adjacent ends of said toe edge and said shank edge.

7. A tooth for use in a saw chain comprising a flat, sharpened shank portion and a flat, sharpened toe portion lying, respectively, in substantially perpendicular planes, and at least one flat, sharpened intermediate portion interposed between said shank portion and said toe portion, said sharpened portions defining cutting edges facing in a common forward direction and meeting each other in abrupt angles.

8. A saw chain link carrying a cutter formed to provide a flat, sharpened shank portion and a flat, sharpened toe portion disposed respectively in planes substantially perpendicular to each other, and an intermediate flat, sharpened portion joining said toe portion and said shank portion in abrupt angles, the thickness of said intermediate portion exceeding the thickness of said shank portion and said toe portion.

9. A saw chain link carrying a cutter formed to provide a flat, sharpened shank portion and a flat, sharpened toe portion disposed respectively in planes substantially perpendicular to each other, and an intermediate flat, sharpened portion joining said toe portion and said shank portion in abrupt angles, the adjacent surfaces of said shank portion, said toe portion, and said intermediate portion lying in the surface of a common cylinder.

10. A tooth for use in a saw chain comprising a flat, sharpened shank portion, and a flat, sharpened toe portion lying, respectively, in substantially perpendicular planes, and at least one flat, sharpened intermediate portion interposed between said shank portion and said toe portion, said sharpened portions defining cutting edges facing in a common forward direction and meeting each other in abrupt angles, the leading part of said toe portion consisting of a separate tip element formed of an ultra-hard alloy, at least a part of the cutting edge of said intermediate portion being formed on said tip element.

11. A saw chain link carrying a cutter formed to provide shank and toe portions, and an intermediate portion joining said toe and shank portions, said portions having a leading end sharpened to provide a cutting edge and said portions each comprising a flat outer surface thereby providing a plurality of straight-line sections along said cutting edge.

12. A tooth for use in a saw chain comprising a flat, sharpened shank portion and a flat, sharpened toe portion lying, respectively, in substantially perpendicular planes, at least one flat, sharpened intermediate portion interposed between said shank portion and said toe portion, said sharpened portions defining cutting edges facing in a common forward direction and meeting each other in abrupt angles, the cutting edge of said toe portion inclining rearwardly as it retreats from its juncture with the cutting edge of said intermediate portion, and the cutting edge of said intermediate portion inclining rearwardly as it retreats from its juncture with the cutting edge of said shank portion.

References Cited in the file of this patent

UNITED STATES PATENTS

| | | |
|---|---|---|
| 938,158 | Lucas | Oct. 26, 1909 |
| 2,326,854 | Hassler | Aug. 17, 1943 |
| 2,508,784 | Cox | May 23, 1950 |
| 2,558,678 | Garrett | June 26, 1951 |
| 2,622,636 | Cox | Dec. 23, 1952 |
| 2,652,076 | Bye | Sept. 15, 1953 |

FOREIGN PATENTS

| | | |
|---|---|---|
| 2,148 | Italy | Dec. 31, 1889 |